: US009639429B2

United States Patent
Stewart et al.

(10) Patent No.: US 9,639,429 B2
(45) Date of Patent: May 2, 2017

(54) CREATING VALIDATED DATABASE SNAPSHOTS FOR PROVISIONING VIRTUAL DATABASES

(71) Applicant: Delphix Corp., Menlo Park, CA (US)

(72) Inventors: Michael J. Stewart, San Francisco, CA (US); Vinay H. Srihari, San Mateo, CA (US); Subhadeep Sinha, Union City, CA (US); Adam H. Leventhal, San Francisco, CA (US); Matthew Allan Ahrens, San Francisco, CA (US)

(73) Assignee: Delphix Corporation, Menlo Park, CA (US)

( * ) Notice: Subject to any disclaimer, the term of this patent is extended or adjusted under 35 U.S.C. 154(b) by 229 days.

(21) Appl. No.: 14/274,614

(22) Filed: May 9, 2014

(65) Prior Publication Data

US 2014/0250081 A1 Sep. 4, 2014

Related U.S. Application Data

(63) Continuation of application No. 13/645,409, filed on Oct. 4, 2012, now Pat. No. 8,788,461.

(51) Int. Cl.
*G06F 17/30* (2006.01)
*G06F 11/14* (2006.01)

(52) U.S. Cl.
CPC ...... *G06F 11/1458* (2013.01); *G06F 11/1469* (2013.01); *G06F 11/1471* (2013.01);
(Continued)

(58) Field of Classification Search
None
See application file for complete search history.

(56) References Cited

U.S. PATENT DOCUMENTS 4,853,843 A 8/1989 Ecklund
5,634,053 A 5/1997 Noble et al.
(Continued)

FOREIGN PATENT DOCUMENTS

JP 2005532611 A 10/2005

OTHER PUBLICATIONS

"FlexVol™ abd FlexClone™ Software," Datasheet, Network Appliance, Inc., 2004, 2 Pages.
(Continued)

*Primary Examiner* — Jay Morrison
(74) *Attorney, Agent, or Firm* — Fenwick & West LLP (57) ABSTRACT

Virtual databases are provisioned using point-in-time copies of a source database. Transaction logs received from the source database are applied to a point-in-time copy of the source database to create recovery milestones comprising database blocks that can be used to provision virtual databases. The recovery milestones are created in advance of receiving a request to provision a virtual database. Each recovery milestone is validated to determine that a consistent database snapshot can be created using the recovery milestone. If a problem is identified that prevents creation of a consistent database snapshot, the problem is fixed before creating the next recovery milestone. In response to receiving a request to provision a virtual database corresponding to a point in time, a recovery milestone is identified and transaction logs applied to the recovery milestone to create a database snapshot corresponding to the requested point in time.

19 Claims, 5 Drawing Sheets

(52) U.S. Cl.
CPC ...... *G06F 11/1446* (2013.01); *G06F 2201/80* (2013.01); *G06F 2201/82* (2013.01); *G06F 2201/84* (2013.01)

(56) References Cited

U.S. PATENT DOCUMENTS

| | | | |
|---|---|---|---|
| 5,680,608 | A | 10/1997 | Chang et al. |
| 5,680,618 | A | 10/1997 | Freund |
| 5,819,292 | A | 10/1998 | Hitz et al. |
| 6,523,036 | B1 | 2/2003 | Hickman |
| 6,883,083 | B1 | 4/2005 | Kemkar |
| 6,920,457 | B2 | 7/2005 | Pressmar |
| 7,107,385 | B2 | 9/2006 | Rajan et al. |
| 7,181,476 | B2 | 2/2007 | Lee et al. |
| 7,197,491 | B1 | 3/2007 | Chou et al. |
| 7,225,204 | B2 | 5/2007 | Manley et al. |
| 7,269,607 | B2 | 9/2007 | Cotner et al. |
| 7,334,094 | B2 | 2/2008 | Fair |
| 7,334,095 | B1 | 2/2008 | Fair et al. |
| 7,340,461 | B2 | 3/2008 | Vishlitzky et al. |
| 7,373,364 | B1 | 5/2008 | Chapman |
| 7,386,695 | B2 | 6/2008 | Fuente |
| 7,409,511 | B2 | 8/2008 | Edwards et al. |
| 7,457,982 | B2 | 11/2008 | Rajan |
| 7,539,836 | B1 | 5/2009 | Klinkner |
| 7,587,563 | B1 | 9/2009 | Teterin et al. |
| 7,590,660 | B1 | 9/2009 | Richards et al. |
| 7,631,018 | B2 | 12/2009 | Lee et al. |
| 7,631,021 | B2 | 12/2009 | Sarma et al. |
| 7,653,794 | B2 | 1/2010 | Michael et al. |
| 7,743,035 | B2 | 6/2010 | Chen et al. |
| 7,757,056 | B1 | 7/2010 | Fair |
| 7,779,051 | B2 | 8/2010 | Friedlander et al. |
| 7,822,758 | B1 | 10/2010 | Prakash et al. |
| 7,827,366 | B1 | 11/2010 | Nadathur et al. |
| 7,856,424 | B2 | 12/2010 | Cisler et al. |
| 7,877,357 | B1 | 1/2011 | Wu et al. |
| 7,895,228 | B2 | 2/2011 | Cragun et al. |
| 7,937,547 | B2 | 5/2011 | Liu et al. |
| 7,941,470 | B2 | 5/2011 | Le et al. |
| 7,996,636 | B1 | 8/2011 | Prakash et al. |
| 8,037,032 | B2 | 10/2011 | Pershin et al. |
| 8,150,808 | B2 | 4/2012 | Zha et al. |
| 8,280,858 | B2 | 10/2012 | Ahrens et al. |
| 8,311,988 | B2 | 11/2012 | Cisler et al. |
| 8,532,973 | B1 | 9/2013 | CaraDonna et al. |
| 8,775,663 | B1 | 7/2014 | Singh |
| 2002/0083037 | A1 | 6/2002 | Lewis et al. |
| 2002/0143764 | A1 | 10/2002 | Martin et al. |
| 2003/0204597 | A1 | 10/2003 | Arakawa et al. |
| 2004/0054648 | A1 | 3/2004 | Mogi et al. |
| 2004/0139127 | A1* | 7/2004 | Pofelski ............. G06F 11/1446 |
| 2005/0114701 | A1 | 5/2005 | Atkins et al. |
| 2006/0224636 | A1* | 10/2006 | Kathuria ............ G06F 11/1471 |
| 2007/0219959 | A1 | 9/2007 | Kanemasa |
| 2008/0307345 | A1 | 12/2008 | Hart et al. |
| 2009/0080398 | A1 | 3/2009 | Mahany et al. |
| 2009/0132611 | A1 | 5/2009 | Brown et al. |
| 2009/0144224 | A1 | 6/2009 | Phan et al. |
| 2009/0177697 | A1 | 7/2009 | Gao et al. |
| 2009/0222496 | A1 | 9/2009 | Liu et al. |
| 2009/0240744 | A1 | 9/2009 | Thomson et al. |
| 2009/0292734 | A1 | 11/2009 | Miloushev et al. |
| 2011/0004586 | A1 | 1/2011 | Cherryholmes et al. |
| 2011/0093435 | A1* | 4/2011 | Zha ................... G06F 17/30566 707/639 |
| 2011/0093436 | A1* | 4/2011 | Zha ................... G06F 17/30592 707/639 |
| 2011/0161295 | A1 | 6/2011 | Ngo |
| 2011/0161973 | A1 | 6/2011 | Klots et al. |
| 2012/0297249 | A1 | 11/2012 | Yang et al. |

OTHER PUBLICATIONS

"FlexClone" Datasheet, Network Appliance, Inc., 2008, 2 Pages.
Meeks, J., "An Oracle Technical White Paper-Oracle Data Guard with Oracle Database 11g Release 2," Oracle, Sep. 2009, 20 Pages.
"NetApp SnapMirror," Datasheet, Network Appliance, Inc., 2008, 2 Pages.
"NetApp Snapshot Technology," Datasheet, Network Appliance, Inc., 2004, 1 Page.
"NetApp SnapManager for Oracle," Datasheet, Network Appliance, Inc., 2008, 2 Pages.
Prasad, STS., et al., "Virtual Database Technology, XML, and the Evolution of the Web", IEEE Computer Society Technical Committee on Data Engineering, 1998, pp. 1-5.
Rajaraman, A., et al., "Virtual Database Technology: Transforming the Internet into a Database", IEEE Internet Computing, Jul./Aug. 1998, pp. 55-58.
Sadagopan, S., "Introduction to WebSphere Federation Server", IBM Data Management Solutions, 2005, pp. 1-45.
"Virtual Databases", Jan. 7, 2008, 4 Pages, [online] [Retrieved on Sep. 19, 2011] Retrieved from the internet <URL:http://www.db2dean.com/PreviouslVirtualDB.html>.
Wilson, A.J., et al., "Multiple Virtual Databases to Support Multiple VOS in R-GMA", CCLRC-Rutherford Appleton Laboratory, UK, 2006, 3 Pages.
PCT International Search Report and Written Opinion, PCT/US2010/052963, Dec. 10, 2010, 16 Pages.
PCT International Search Report and Written Opinion, PCT/US2010/052960, Dec. 10, 2010, 17 Pages.
PCT International Search Report and Written Opinion, PCT/US2010/060536, Feb. 28, 2011, 12 Pages.
PCT International Search Report and Written Opinion for PCT/US2013/063120, Dec. 24, 2013, 6 Pages.
Essential CVS, Second Edition, by: Jennifer Vesperman, Publisher: O'Reilly Media, Inc., Pub. Date: Nov. 20, 2006, Print ISBN-13: 978-0-596-52703-7, pp. 1-266.
Office Action for U.S. Appl. No. 13/645,409, Dec. 13, 2013, 11 Pages.
Boppana, U., "Using FlexClone to Clone Files and LUNs," NetApp Technical Report, Mar. 2010, 32 Pages.
Creek, T., "Applications for Writeable LUNs and LUN Cloning in Oracle Environments," NetApp, Technical Report, Jun. 2003, 10 Pages.
Degwekar, A., "Using SnapMirror with SnapDrive for UNIX," NetApp Technical Report, 2007, 11 Pages.
Gmane, Discussion regarding "File level snapshots in ZFS," From the zfs-discuss@opensolaris.org mailing list, Mar. 30, 2007, 1 Page, Can be retrieved at <URL:http://article.gmane.org/gmane.os.solaris.opensolaris.zfs/7759/match=snapshot>.
Gmane, Discussion regarding "ZFS Clone Promotion [PSARC/2006/303 Timeout: May 12, 2006]," From the zfs-discuss@opensolaris.org mailing list, May 9, 2006, 2 Pages, Can be retrieved at <URL:http://article.gmane.org/gmane.os.solaris.opensolaris.zfs/194/match=clone>.
Gmane, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.opensolaris.zfs/224/match=cloning>.
Gmane, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.opensolaris.zfs/229/match=zfs+clone+promotion>.
Gmane, Discussion regarding "ZFS snapshot improvement," From the zfs-discuss@opensolaris.org mailing list, May 10, 2006, 1 Page, Can be retrieved at <URL:http://article.gmane.org/gmane.os.solaris.openolaris.zfs/232/match=snapshot>.
Gmane, Discussion regarding "ZFS promotions," From the zfs-discuss@opensolaris.org mailing list, Dec. 12, 2008, 2 Pages, Can be retrieved at <URL:http://article.gmane.org/gmane.os.solaris.openolaris.zfs/22347/match=clone>.

(56) References Cited

OTHER PUBLICATIONS

Higgins, B., et al., "Backup and Recovery Snap Manager for SQL Server," DLA Piper, Nov. 2008, 37 Pages.
Hitz, D., et al., "File System Design for an NFS File Server Appliance," Technical Report, USENIX, Winter 1994, 23 Pages.
Jackson, J., "ZFS: The future for storage networks?; File system has massive capacity, but licensing issues and architectural concerns persist," Government Computer News, Media, Inc., Jun. 25, 2007, 2 Pages.
Kay, D., "Working with ZFS Snapshots," Solaris 10 How-To Guides, Version 1.0, Sun Microsystems, Inc., Jan. 5, 2009, 8 Pages.
Kilvansky, M., "A Thorough Introduction to FlexClone Volumes," NetApp, Technical White Paper, Oct. 2004, 35 Pages.
Lal, J., et al., "DB2: Cloning a Database using NetApp FlexClone Technology," NetApp, Apr. 30, 2006, 60 Pages.
Merrill, J., et al., "SnapVault Best Pratices Guide," NetApp Technical Report, 2008, 29 Pages.
Nadgir, N., "Databases and ZFS," Oracle Blog, Sep. 25, 2006, 8 Pages, Can be retrieved from <URL:https://blog.oracle.com/realneel/entry/zfs_and_databases>.
Network Appliance, Inc., "Data ONTAP 7.2 Commands: Manual Page Reference, vol. 1," May 16, 2008, 615 Pages.
Network Appliance, Inc., "NetApp Data Management for Decision Support Systems," 2005-2010, 4 Pages.
Network Appliance, Inc., "Flexvol and Flexclone Software," 2006, 2 Pages.
Network Appliance, Inc., "SnapManager 3.0 for Oracle Installation and Administration Guide," Nov. 2008, 294 Pages.
Network Appliance, Inc., "SnapManager 2.2 for Oracle Installation and Administration Guide," Nov. 2007, 310 Pages.
Network Appliance, Inc., "SnapManager 5.0 for Microsoft SQL Server Installation and Administration Guide," Oct. 2008, 492 Pages.
Network Appliance, Inc., "Network Appliance Snapmirror Software," 2006, 2 Pages.
Oracle, "Oracle Database Backup and Recovery User's Guide," 11g Release 1(11.1), Aug. 2008, 598 Pages.
Osuna, A., "An Introduction to FlexClone Volumes" Redbooks, IBM, 2006, 50 Pages.
Osuna, A., "Using IBM DB2 UDB with IBM System Storage N series" Redbooks, IBM, Dec. 2006, 136 Pages.
Osuna, A., "Data Protection Strategies in IBM System Storage N Series" Redbooks, IBM, Jun. 2008, 90 Pages.
Osuna, A., "IBM System Storage N Series SnapMirror" Redbooks, IBM, Jul. 2006, 124 Pages.
Osuna, A., "IBM System Storage N Series SnapVault Best Practices Guide" Redbooks, IBM, 2007, 54 Pages.
Patel, D., et al., "Rapid Database Development and Deployment," NetApp White Paper, Mar. 2007, 11 Pages.
Patterson, H., et al., "SnapMirror: File System Based Asynchronous Mirroring for Disaster Recovery," USENIX Association, Proceedings of the FAST 2002 Conference on File and Storage Technologies, Jan. 28-30, 2002, 14 Pages.
Sadagopan, P., et al., "Oracle Fusion Middleware DR Solution Using NetApp Storage," NetApp Technical Report, May 2008, 38 Pages.
Schuettinger, S., "NetApp Technical Report—Rapid Deployment of Oracle Database 11g Using VMWare Infrastructure and NetApp Flexclone," NetApp, Jan. 2008, 24 Pages.
Schuettinger, S., "Helping DBAs Become More Efficient NetApp Efficiency and Manageability Advantages," NetApp White Paper, Jul. 2009, 12 Pages.
Sun Microsystems, Inc., "ZFS the File System of the Future," 19 Pages. [Publication date is unknown].
Sun Microsystems, Inc., "Solaris ZFS Administration Guide," Aug. 2006, 164 Pages.
Sun Microsystems, Inc., "Solaris ZFS Administration Guide," Mar. 2009, 292 Pages.
Sun Microsystems, Inc., "System Administration Guide: Virtualization Using the Solaris Operating System," Oct. 2009, 562 Pages.
Syncsort Incorporated, "Near-Instant Oracle Cloning with Syncsort AdvancedClient Technologies," Synscort, White Paper, 2007, 12 Pages.
Syncsort Incorporated, "Syncsort Backup Express Advanced Recovery for NetApp," Synscort, 2008, 12 Pages.
Watanabe, S., "Solaris 10 ZFS Essentials," Sun Microsystems, 2010, 146 Pages.
Wikipedia, "ZFS," Last Modified Jul. 22, 2014, 14 Pages.
"ZFS Snapshot and Amazon S3 (Part 2 of 2)," Paul's Blog 3.0 (Release Candidate), Oracle, 2007, 5 Pages.
Chapman et al., "SnapMirror® Best Practices Guide, NetApp, Inc. Technical Report TR-3446," Apr. 2006, 63 Pages.
Edwards, et al., "FlexVol: Flexible, Efficient File Volume Virtualization in WAFL," Jun. 22, 2008, 22 Pages.
IBM, "IBM System Storage SAN Volume Controller Software V4.3.0 introduces space-efficient VDisks and VDisk mirroring," IBM United States Announcement 208-114, May 13, 2008, 17 Pages.
Microsoft, Microsoft Developer's Network, "Pages and Extents," Microsoft Corporation ("Pages and Extents") Sep. 2007, 2 Pages.
Mullins, "Excerpts of DB2 Developer's Guide, Fifth Ed." May 2004, 5 Pages.
NetApp, 2007 NetApp, Inc., Data ONTAP 7.1 Data Protection Online Backup and Recovery Guide, NetApp Technical Doc, Jan. 12, 2007, pp. 508.
NetApp, "Datasheet FlexClone," NetApp Technical Doc, 2008, 2 Pages.
NetApp, "Datasheet FlexVol™ and FlexClone™ Software," NetApp Technical Doc, 2004, 2 Pages.
NetApp, "Datasheet Netapp SnapManager for Oracle," NetApp Technical Doc, 2008, 2 Pages.
NetApp, "Datasheet NetApp SnapMirror," NetApp Technical Doc, 2008, 2 Pages.
NetApp, "Datasheet NetApp Snapshot Technology," NetApp Technical Doc, 2004, 1 Page.
Ranganathan, A., and Neto, A., "Technical Report, SnapManager 3.0 for Oracle Best Practices, TR-3761" Apr. 2009, 88 Pages.
Sun Microsystems, Inc., "ZFS the File System of the Future," Apr. 27, 2009, 19 Pages.
Tate, J., et al., "Implementing the IBM System Storage SAN Volume Controller V4.3," IBM Redbook SG24-6423-06, Oct. 2008, 970 Pages.
VMware, Inc. and EMC Corporation, "Accelerate Oracle Database log Creation and Deployment Using VMware Infrastructure and EMC Celerra Writeable Checkpoints," Mar. 2008, 16 Pages.
VMware, Inc. and IBM "Using IBM® TotalStorage® Enterprise Storage Server® FlashCopy® Function with the VMware ESX 2.5 Server ("ESX IBM")," Sep. 1, 2005, 25 Pages.
VMware, Inc., "Using Clones to Streamline Development ("Ws5 Clones")," 2005, 9 Pages.
VMware, Inc., "Using VMware Infrastructure for Backup and Restore ("Esx3")," 2006, 20 Pages.
VMware, Inc., "Workstation 5 User's Manual ("WS5 Manual")," 2006, 492 Pages.
Declaration of Erez Zadok in Support of Petition for Inter Partes Review of U.S. Pat. No. 8,161,077, Oct. 6, 2014, 87 Pages.
Declaration of Erez Zadok in Support of Petition for Inter Partes Review of U.S. Pat. No. 8,161,077, Oct. 6, 2014, 95 Pages.
Declaration of Erez Zadok in Support of Petition for Inter Partes Review of U.S. Pat. No. 8,468,174, Oct. 23, 2014, 98 Pages.
Declaration of Erez Zadok in Support of Petition for Inter Partes Review of U.S. Pat. No. 8,468,174, Oct. 23, 2014, 99 Pages.
Declaration of Erez Zadok in Support of Petition for Inter Partes Review of U.S. Pat. No. 8,566,361, Oct. 21, 2014, 99 Pages.
Declaration of Erez Zadok in Support of Petition for Inter Partes Review of U.S. Pat. No. 8,566,361, Oct. 21, 2014, 84 Pages.
Declaration of Erez Zadok in Support of Petition for Inter Partes Review of U.S. Pat. No. 8,150,808, Oct. 2, 2014, 85 Pages.
Declaration of Erez Zadok in Support of Petition for Inter Partes Review of U.S. Pat. No. 8,150,808, Oct. 2, 2014, 78 Pages.
Declaration of Erez Zadok in Support of Petition for Inter Partes Review of U.S. Pat. No. 8,150,808, Oct. 2, 2014, 84 Pages.

(56) References Cited

OTHER PUBLICATIONS

Declaration of Erez Zadok in Support of Petition for Inter Partes Review of U.S. Pat. No. 8,150,808, Oct. 6, 2014, 97 Pages.
Declaration of Erez Zadok in Support of Petition for Inter Partes Review of U.S. Pat. No. 8,548,944, Oct. 7, 2014, 98 Pages.
Declaration of Erez Zadok in Support of Petition for Inter Partes Review of U.S. Pat. No. 8,548,944, Oct. 8, 2014, 98 Pages.
Petition for Inter Partes Review of U.S. Pat. No. 8,161,077, Oct. 6, 2014, 62 Pages.
Petition for Inter Partes Review of U.S. Pat. No. 8,161,077, Oct. 6, 2014, 65 Pages.
Petition for Inter Partes Review of U.S. Pat. No. 8,468,174, Oct. 23, 2014, 64 Pages.
Petition for Inter Partes Review of U.S. Pat. No. 8,566,361, Oct. 21, 2014, 66 Pages.
Petition for Inter Partes Review of U.S. Pat. No. 8,150,808, Oct. 3, 2014, 65 Pages.
Petition for Inter Partes Review of U.S. Pat. No. 8,150,808, Oct. 3, 2014, 61 Pages.
Petition for Inter Partes Review of U.S. Pat. No. 8,150,808, Oct. 7, 2014, 65 Pages.
Petition for Inter Partes Review of U.S. Pat. No. 8,548,944, Oct. 8, 2014, 66 Pages.
Petition for Inter Partes Review of U.S. Pat. No. 8,548,944, Oct. 8, 2014, 65 Pages.
Notice of Grounds for Rejection for Japanese Patent Application No. P2014-155597, Apr. 21, 2015, 5 Pages.
Kakinoki, T., et al., "Query Language for Enterprise Data Integration in SaaS Environment," Institute of Electronics, Information and Communication Engineers, Data Engineering Workshop Collected Papers No. 19, (DEWS 2008 C3-1), Japan, The Institute of Electronics, Information and Communication Engineers, Data Engineering Research Committee, Apr. 7, 2008, 4 Pages. (With English Abstract).
Final Written Decision, Before the Patent Trial and Appeal Board of United States Patent and Trademark Office, Case IPR2015-00034, U.S. Pat. No. 8,150,808 B2, Apr. 16, 2016, 100 Pages.
Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 8.
Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 61.
Final Written Decision, Before the Patent Trial and Appeal Board of United States Patent and Trademark Office, Case IPR2015-00016 & IPR2015-00019, U.S. Pat. No. 8,150,808 B2, Apr. 13, 2016, 107 Pages.
Final Written Decision, Before the Patent Trial and Appeal Board of United States Patent and Trademark Office, Case IPR2015-00014, U.S. Pat. No. 8,150,808 B2, Apr. 13, 2016, 92 Pages.
Final Written Decision, Before the Patent Trial and Appeal Board of United States Patent and Trademark Office, Case IPR2015-00025 & IPR2015-00026, U.S. Pat. No. 8,161,077 B2, Apr. 12, 2016, 94 Pages.
Final Written Decision, Before the Patent Trial and Appeal Board of United States Patent and Trademark Office, Case IPR2015-00052, U.S. Pat. No. 8,548,944 B2, Mar. 31, 2016, 25 Pages.
Final Written Decision, Before the Patent Trial and Appeal Board of United States Patent and Trademark Office, Case IPR2015-00050, U.S. Pat. No. 8,548,944 B2, Mar. 31, 2016, 26 Pages.
Final Written Decision, Before the Patent Trial and Appeal Board of United States Patent and Trademark Office, Case IPR2015-00108, U.S. Pat. No. 8,566,361 B2, Apr. 29, 2016, 61 Pages.
Final Written Decision, Before the Patent Trial and Appeal Board of United States Patent and Trademark Office, Case IPR2015-00108, U.S. Pat. No. 8,566,361 B2, May 11, 2016, 57 Pages.
European Search Report for European Patent Application No. EP 13843496.4, Aug. 23, 2016, 12 Pages.
Office Action for Canadian Patent Application No. CA 2,885,056, May 18, 2016, 5 Pages.

* cited by examiner

CREATING VALIDATED DATABASE SNAPSHOTS FOR PROVISIONING VIRTUAL DATABASES

CROSS REFERENCE TO RELATED APPLICATION

This application is a continuation of U.S. patent application Ser. No. 13/645,409 filed on Oct. 4, 2012, which is incorporated by reference in its entirety.

BACKGROUND

This invention relates generally to databases, and in particular to provisioning of virtual databases in advance of a request by creating validated database snapshots.

Databases store data that is critical to an organization and thus form an important part of an organization's information technology infrastructure. As the information available in an organization grows, so does the complexity of the infrastructure required to manage the databases that store the information. The increased complexity of the infrastructure increases the resources required to manage the databases and the applications that depend on the databases. These increased costs may include the costs associated with hardware for managing the databases as well as the costs associated with additional personnel needed to maintain the hardware. The increased complexity of the infrastructure also affects the maintenance operations associated with the databases, for example, causing backup and recovery operations to take significantly longer.

In a typical organization's infrastructure environment, production database servers run applications that manage the day-to-day transactions of the organization. Changes to production databases or to applications that depend on the production databases are tested on copies of the databases to protect the production environment. Copies of the production databases may be required for several stages in the lifecycles of workflows associated with the production database and applications that depend on the production databases. For example, the stages in the lifecycle of a change incorporated in a production database may include a development stage, a tuning stage, a testing stage, a quality assurance stage, a certification stage, a training stage, and a staging stage. Making copies of the production databases for each stage requires redundant and expensive hardware infrastructure as well as the time overhead required to copy the data, which may take significant amount of time.

SUMMARY

To address the needs unmet by existing database technologies, embodiments of the invention pre-provision validated database snapshots in advance of receiving a request. A database storage system receives different point-in-time copies of a source database comprising database blocks of the source database and stores them on a storage system. The database storage system receives transaction logs from the source database corresponding to transactions executed by the source database. The database storage system creates multiple recovery milestones, each recovery milestone comprising database blocks to which transaction logs are applied to create a consistent snapshot corresponding to a point in time version of the source database. At least some of the stored database blocks are associated with multiple recovery milestones. Each recovery milestone is created by applying the transaction logs to either a point-in-time copy of the source database or to a previous recovery milestone. The database storage system validates the recovery milestones created to determine whether a consistent snapshot of the source database can be created using the recovery milestone. If the database storage system receives a request to create a virtual database, the database storage system identifies a recovery milestone and provisions the requested virtual database based on the recovery milestone.

In an embodiment, if the database storage system determines that a recovery milestone is invalid, the database storage system executes steps to identify the cause of creation of the invalid recovery milestone and takes measures to create a corresponding valid recovery milestone.

The features and advantages described in this summary and the following detailed description are not ail-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A database comprises data stored in a computer for use by computer implemented applications. A database server is a computer program that can interact with the database and provides database services, for example, access to the data stored in the database. Database servers include commercially available programs, for example, database servers included with database management systems provided by ORACLE, SYBASE, MICROSOFT SQL SERVER, IBM DB2, MYSQL, POSTGRES, and the like. A database may be implemented using a database model, for example, a relational mode, object model, hierarchical mode or network model. The term "production database" is used in particular examples to illustrate a useful application of the technology; however, it can be appreciated that the techniques disclosed can be used for any database, regardless of whether the database is used as a production database. Furthermore, embodiments can create a virtual database using storage level snapshots of production databases or clones of production databases instead of a live production database. The virtual databases are "virtual" in the sense that the physical implementation of the database files is decoupled from the logical use of the database files by a database server. Virtual databases are described in U.S. patent application Ser. No. 12/603,541 filed on Oct. 21, 2009, and issued as U.S. Pat. No. 8,150,808, each of which is incorporated by reference herein in its entirety.

In one embodiment, information from the production database is copied to a database storage system at various times, such as periodically. A virtual database created for a point in time is stored as a set of files that contain the information of the database as available at that point in time. Each file includes a set of database blocks and the data structures for referring to the database blocks. The files corresponding to the virtual database are made available to the database server using a file sharing mechanism, which links the virtual database to the appropriate database blocks stored on the storage system. The process of making the virtual database available to a database server is called "provisioning" the virtual database. In some embodiments, provisioning the virtual database includes managing the process of creating a running database server based on virtual database. The database server on which a virtual database has been provisioned can then read from and write to the files stored on the storage system. A database block may be shared between different files, each file associated with a different virtual database. In particular, a database block is shared if the corresponding virtual database systems 130 are only reading the information in the database block and not writing to the database block.

The database storage system receives transaction logs corresponding to transactions executed in the production database since the last point-in-time copy of the production database was obtained. These transaction logs are applied to the point-in-time copy to create a database corresponding to a state of production database in between two point-in-time copies. If a request for provisioning a database corresponding to a time in between two point-in-time copies is obtained, the transaction logs are applied to the most recent point-in-time copy occurring before the time for which the virtual database is requested. The most time consuming step in provisioning a virtual database is applying the transaction logs to a point-in-time copy. Furthermore, if there is any corruption in the data used to create the virtual database, the database storage system may not be able to apply the transaction logs without taking steps to fix the problem causing the corruption of the transaction logs. The steps taken to fix any problem may be slow, for example, a step may require human intervention. As a result, provisioning the virtual database can take significant amount of time since a request for provisioning is received, causing the requestor to wait.

Embodiments reduce the amount of time between receiving a request for a virtual database and provisioning the requested virtual database. The database storage system creates multiple recovery milestones after receiving a point-in-time copy of the production database. Each recovery milestone corresponds to a state of the production database at a point in time. Each recovery milestone is created by applying transaction logs to the database blocks received as a point-in-time copy of the production database. The database storage system also performs validation of recovery milestones to make sure that a valid database snapshot can be created using the recovery milestone. If a problem is detected, the database storage system may take appropriate steps to fix the problem. Fixing these problems in advance of receiving any request for provisioned databases reduces the time that a requestor has to wait if the corruption of data or a bug or defect in a software module is identified after receiving a request for provisioning virtual database.

Furthermore, since the transaction logs stored in the database storage system are applied to the point-in-time copies, the rate at which the point-in-time copies are received from the production database can be reduced compared to a system in which the recovery milestones are not created. Besides significant time savings can be achieved if multiple virtual databases are provisioned corresponding to the same point in time, for example, different virtual databases provisioned for different platforms.

Overall System Environment

Figure 1:
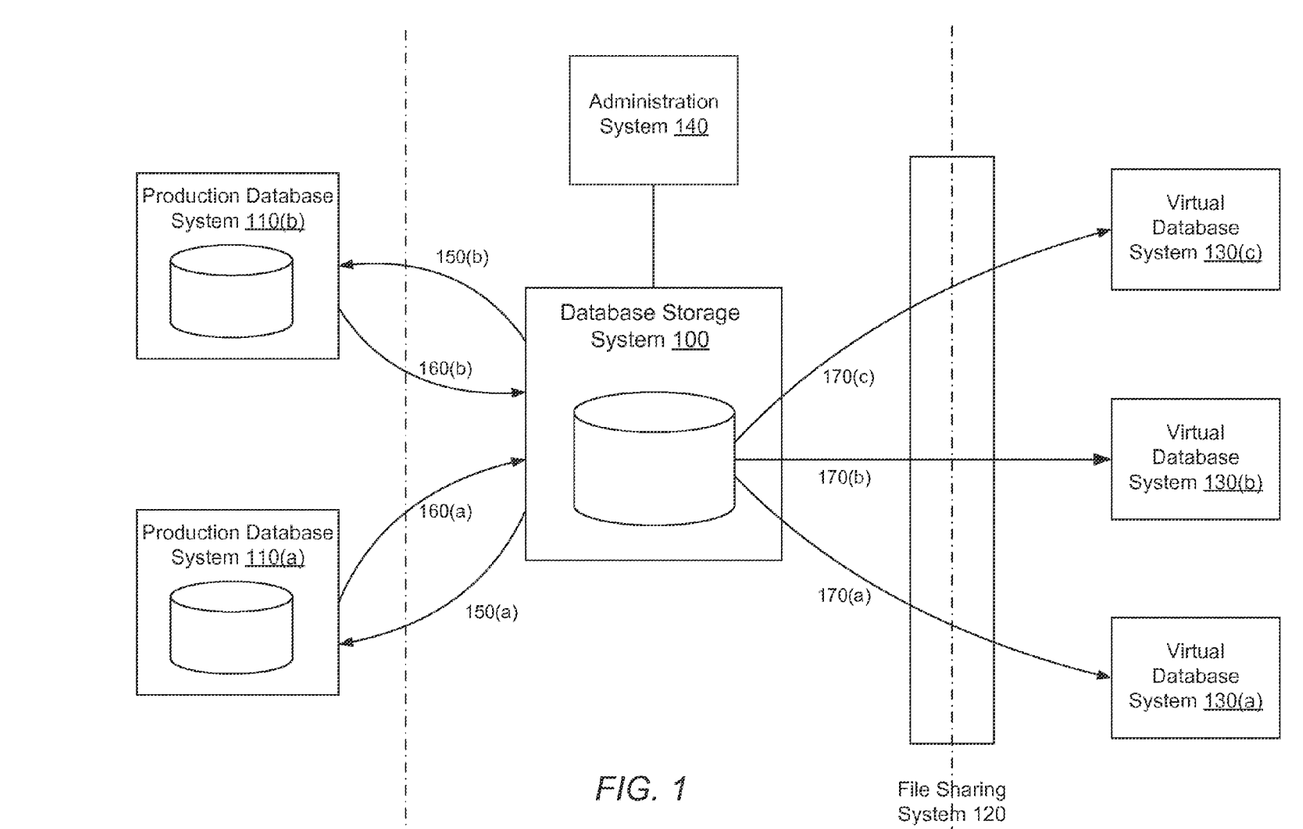
FIG. 1 is diagram illustrating how information is copied from a production database to a database storage system and provisioned as virtual databases using a file sharing system, in accordance with an embodiment of the invention.

FIG. 1 illustrates one embodiment for how information may be copied from a production database to a database storage system and provisioned as virtual databases using a file sharing system. The production database systems 110 manage data for an organization. In some embodiments information may be copied from storage level snapshots of production databases or clones of production databases instead of a live production database. The database storage system 100 retrieves data associated with databases from one or more production database systems 110 and stores the data in an efficient manner, further described below. A database administrator user interface allows a database administrator to perform various actions supported by the database storage system 100.

In response to a request from the administrator system 140, or based on a predefined schedule, the database storage system 100 may send a request 150 for data to a production database system 110. The production database system 110 responds by sending information stored in the production database as a stream of data 160. The request 150 is sent periodically and the production database system 110 responds by sending information representing changes of data stored in the production database since the last response 160 sent by the production database system 110. The database storage system 100 receives the data 160 sent by the production database system 110 and stores the data. The database storage system 100 may analyze the data 160 received to determine whether to store the information or skip the information if the information is not useful for reconstructing the database at previous time points. The database storage system 100 stores the information efficiently, for example, by keeping versions of database blocks that have changed and reusing database blocks that have not changed.

To create a virtual database, the database storage system 100 creates files that represent the information corresponding to the production database system 110 at a given point in time. The database storage system 100 exposes 170 the corresponding files to a virtual database system 130 using a file sharing system 120. The virtual database system 130 runs a database server that can operate with the files exposed 170 by the database storage system 100. Hence, a virtual copy of the production database is created for the virtual database system 130 for a given point in time in a storage efficient manner.

System Architecture

Figure 2:
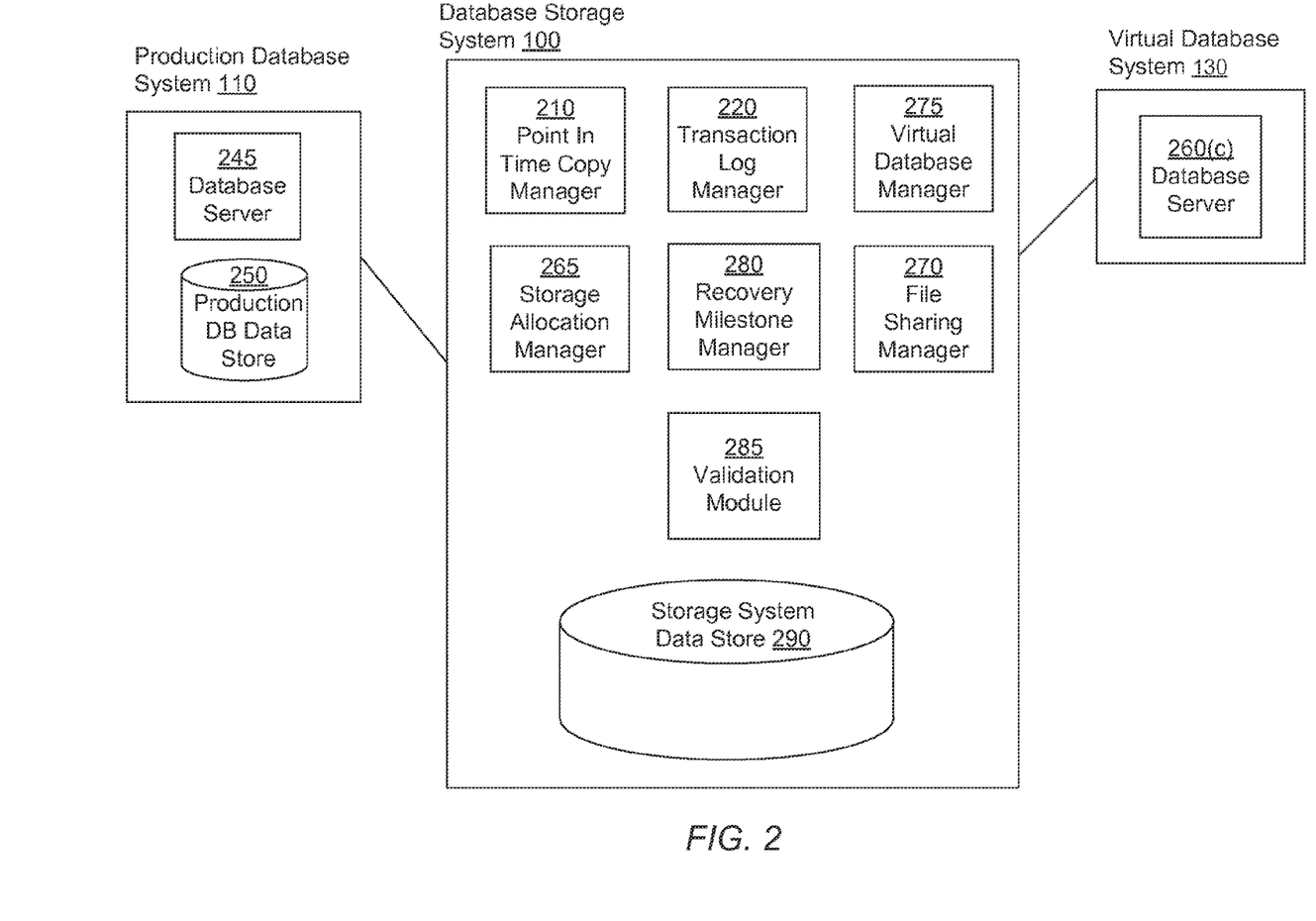
FIG. 2 is a schematic diagram of the architecture of a sys em that makes storage efficient copies of information from a production database and provisions virtual databases, in accordance with an embodiment of the invention.

FIG. 2 shows a high level block diagram illustrating a system environment suitable for making storage efficient copies of information from a production database and provisioning one or more virtual databases using that information. The system environment comprises one or more production database systems 110, a database storage system 100, an administration system 140, and one or more virtual database systems 130. Systems shown in FIG. 2 can communicate with each other if necessary via a network.

A production database system 110 is typically used by an organization for maintaining its daily transactions. For example, an online bookstore may save all the ongoing transactions related to book purchases, book returns, inventory control in a production database system 110. The production database system 110 includes a database server 245 and a production DB data store 250. In alternative configurations, different and/or additional modules can be included in a production database system 110.

The production DB data store 250 stores data associated with a database that may represent for example, information representing daily transactions of an enterprise. The database server 245 is a computer program that provides database services and application programming interfaces (APIs) for managing data stored on the production DB data store 250. Mounting the production DB data store 250 on the database storage system 100 allows transfer of information stored on the production database system 110 to the database storage system 100.

The data stored in the storage system data store 290 can be exposed to a virtual database system 130 allowing the virtual database system 130 to treat the data as a copy of the production database stored in the production database system 110. The database storage system 100 includes a point-in-time copy manager 210, a transaction log manager 220, a storage allocation manager 265, a file sharing manager 270, a virtual database manager 275, a recovery milestone manager 280, a validation module 285, and a storage system data store 290. In alternative configurations, different and/or additional modules can be included in the database storage system 100.

The point-in-time copy manager 210 interacts with the production database system 110 by sending a request to retrieve information representing a point-ill-time copy (also referred to as a "PIT copy") of a database stored in the production DB data store 250. The point-in-time copy manager 210 stores the data obtained from the production database system 110 in the storage system data store 290. The data retrieved by the point-in-time copy manager 210 corresponds to database blocks (or pages) of the database being copied from the production DB data store 250. After a first PIT copy request retrieve information from production DB data store 250, a subsequent PIT copy request may need to retrieve only the data that changed in the database since the previous request. The data collected in the first request can be combined with the data collected in a second request to reconstruct a copy of the database corresponding to a point in time at which the data was retrieved from the production DB data store 250 for the second request.

The transaction log manager 220 sends request to the production database system 110 for retrieving portions of the transaction logs stored in the production database system 110. The data obtained by the transaction log manager 220 from the production database system 110 is stored in the storage system data store 290. In one embodiment, a request for transaction logs retrieves only the changes in the transaction logs in the production database system 110 since a previous request for the transaction logs was processed. The database blocks retrieved by a point in time copy manager 210 combined with the transaction logs retrieved by the transaction log manager 220 can be used to reconstruct a copy of a database in the production system 110 corresponding to times in ti past in between the times at which point-in-time copies are made.

The storage allocation manager 265 provides the functionality of saving data retrieved from the production database system 110. For example, the point-in-time copy manager 210 may call APIs of storage allocation manager to save blocks of data retrieved from the production database system 110. The storage allocation manager 265 keeps track of the various versions of each block of data that may be obtained from the production database system 110. For a given time point, the storage allocation manager 265 can be requested to provide the latest version of a block of data obtained before the given time point. The storage allocation manager 265 can also be used for making copies of blocks of data. If a block of data is copied for read-only purposes, the storage allocation manager 265 allocates only sufficient storage to keep a pointer of reference to the exiting block of data. However, if an attempt to write to the copied block of data is made, the storage allocation manager 265 allocates sufficient storage to make an actual copy of the block of data to avoid updating the original block of data.

The file sharing manager 270 allows files stored in the storage system data store 290 to be shared across computers that may be connected with the database storage system 100 over the network. The file sharing manager 270 uses the file sharing system 120 for sharing files. An example of a system for sharing files is a network file system (NFS). A system for sharing files may utilize fiber channel Storage area networks (FC-SAN) or network attached storage (NAS) or combinations and variations thereof. The system for sharing files may be based on small computer system interface (SCSI) protocol, internet small computer system interface SCSI) protocol, fiber channel protocols or other similar and related protocols. In some embodiments, the database storage system 100 may utilize a logical volume manager. Sharing a file stored in the storage system data store 290 using the file sharing manager 270 allows a remote computer, for example, the virtual database systems 130 to access the data in ti shared file. A remote system ma be able to read and write from/to the file shared by the storage system data store 290. In an embodiment, files are organized in a format emulating a given file system disk layout, such as the file system of WINDOWS operating sys em called NTFS or the UNIX file system (UFS).

The recovery milestone manager 280 creates recovery milestones after a point-in-time copy is received for a production database. Each recovery milestone is created by applying transaction logs to the database blocks received as a point-in-time copy of the production database. The recovery miles one manager 280 invokes the transaction log manager 220 to apply transaction logs to database blocks. The recovery milestone may be stored as a set of files storing the set of database blocks. In an embodiment, the implementation of the recovery milestone is similar to (or same as) the implementation of a point-in-time copy of the database.

The validation module 285, verifies if a recovery milestone can be used to create a consistent snapshot. If the recovery milestone cannot be used to create a valid database snapshot, the validation module 285 executes steps to fix the error. For example, the validation module 285 executes steps to receive appropriate data from the production database, the problem was caused by a bug in a software module, the validation module 285 may take steps to fix the software module, for example, by obtaining a corrected version of the software module from the appropriate vendor. In an embodiment, the validation module 285 provides appropriate information to a system administrator to take the required steps.

In an embodiment, the data blocks stored in the storage system for a recovery milestone are same as the data blocks stored on the storage system for a virtual database created based on the recovery milestone. However, the virtual database may include additional information required to start up a database server based on the recovery milestone, for example, certain configuration information.

The virtual database manager 275 receives requests for creation of a virtual database for a virtual database system 130. The request for creation of a virtual database may be sent by a database administrator using the administration system 140 and identifies a production database system 110, a virtual database system 130, and includes a past point-in-time corresponding to which a virtual database needs to be created. The virtual database manager 275 creates the files corresponding to the virtual database being created and shares the files with the virtual database system 130. The database administrator for a virtual database system 130 may be different from a database administrator for the production database system 110. To create a virtual database from a recovery milestone, virtual database manager 275 computes from metadata, the minimum set of logs that need to be applied to a recovery milestone to make it consistent.

A virtual database system 130 includes a database server 260. The database server 260 is similar in functionality to the database server 245 and is a computer program that provides database services and application programming interfaces (APIs) for managing data stored on a production DB data store 250. The data managed by the database server 260 may be stored on the storage system data store 290 that is shared by the database storage system 100 using a file sharing system 120. In alternative configurations, different and/or additional modules can be included in a virtual database system 130.

It should also be appreciated that in practice at least some of the components of the database storage system 100 may be distributed over multiple computers, communicating over a network. For convenience of explanation, however, the components of the database storage system 100 are discussed as though they were implemented on a single computer. In another embodiment, certain components may be located on a separate system that is coupled to the database storage system 100 by a network. The database storage system 100 may also include one or more input/output devices that allow data to be input and output to and from the system. It will be understood that embodiments of the database storage system 100 also include standard software and hardware components such as operating systems and the like and further include standard hardware components (e.g., network interfaces, storage devices, etc.) not shown in the figure for clarity of example.

Figure 3:
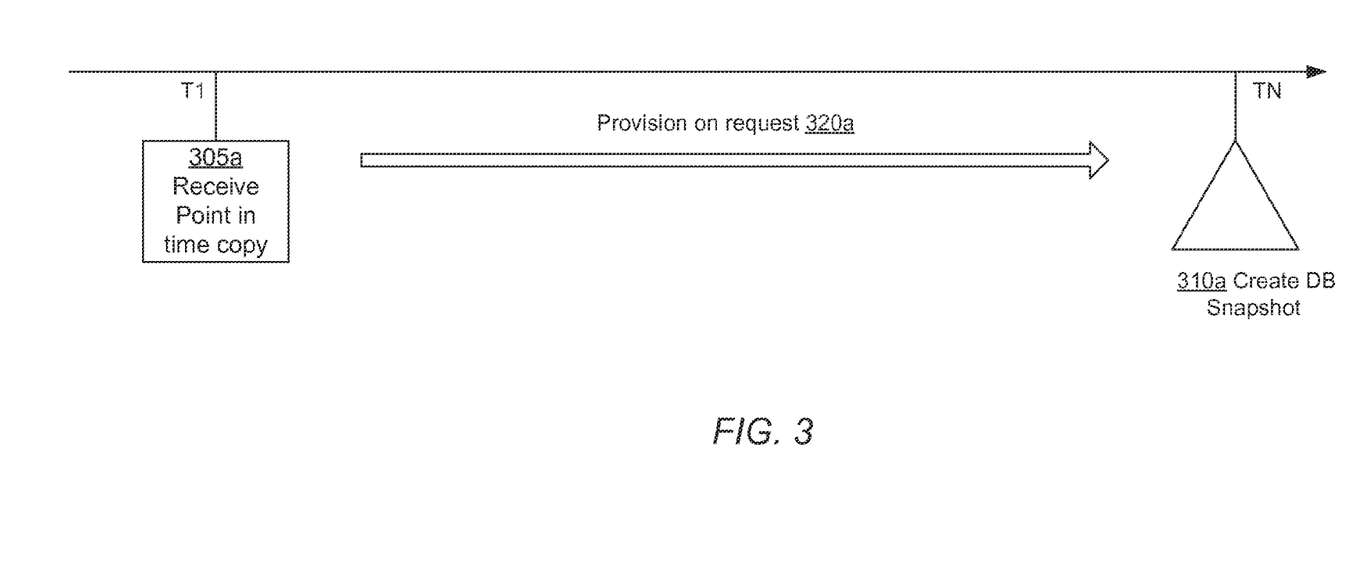
FIG. 3 illustrates a process of provisioning a virtual database upon request from a point-in-time copy of the production database, in accordance with an embodiment of the invention.

FIG. 3 illustrates a process of provisioning a virtual database upon request from a point-in-time copy of the production database. The point-in-time copy manager 210 receives 305 a point-in-time copy of the production database at time T1. The virtual database manager 275 provisions 320 a virtual database upon request from a system administrator. The request for provisioning a virtual database may be received at any time after the point-in-time copy of the production database is received at time T1. The transaction log manager 220 retrieves transaction logs and applies the logs to the point-in-time copy of the production database received to create 310 a DB snapshot. The transaction logs may be received periodically by the transaction manager. However the transaction logs are applied to the point-in-time copy after the request to provision the virtual database is received. Accordingly, a significant amount of transaction logs may have to be applied to the point-in-time copy to provision the virtual database. In an embodiment, the request for provisioning the virtual database specifies a point in time for which the virtual database needs to be provisioned. The transaction logs are provisioned up to the point in time specified in the request. In some embodiments, all transaction logs up to the current time at which the request is received may be applied.

Since transaction logs corresponding to a long time interval are applied to the point-in-time copy of the database, occasionally some of the logs that need to be applied may be corrupted. For example, some logs may be missing or overwritten by other data. The logs may be corrupted due to a bug or defect in the software processing the logs or possibly due to loss of data during transfer. The transaction log manager 220 may recognize that there is corruption of data after applying the logs to the point-in-time copy. For example, the transaction log manager 220 may recognize that applying the logs to the point-in-time copy does not provide a consistent snapshot of the database. In this situation, certain procedure may have to be performed to recover from the invalid data. The procedure may involve human involvement or may be automatic. However, the procedure may require time before a valid state of data is achieved and the requested virtual database can be provisioned. All this delay is experienced after the request for provisioning the virtual database is received. Accordingly, the end user may have to wait for significant amount of time before the end user receives the requested virtual database.

Figure 4:
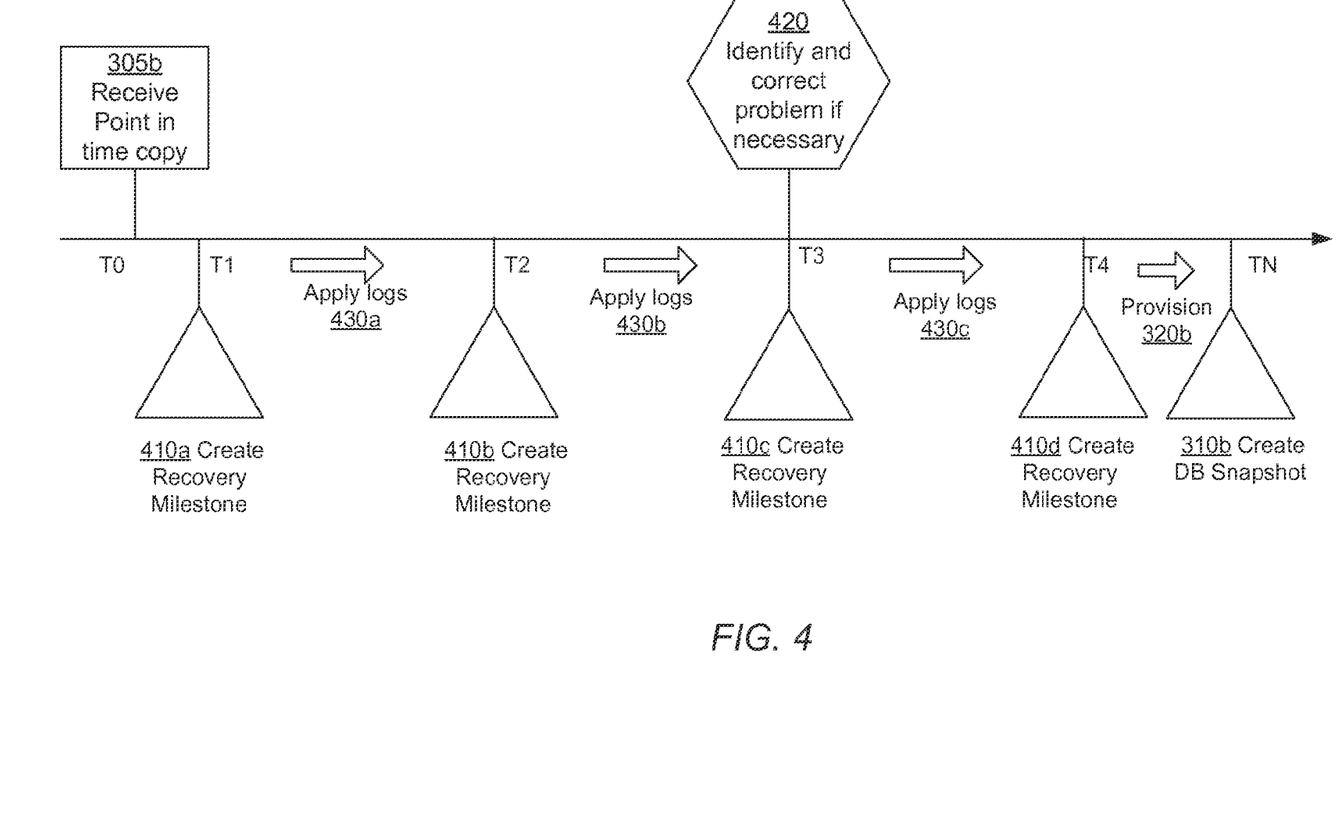
FIG. 4 illustrates a process of pre-provisioning recovery milestones to provision a validated database snapshot, in accordance with an embodiment of the invention, in accordance with an embodiment of the invention.

FIG. 4 illustrates a process of pre-provisioning recovery milestones to provision a validated database snapshot, in accordance with an embodiment of the invention. The process illustrated in FIG. 4 shows a time line indicating various steps that are performed to create multiple recovery milestones and to provision a virtual database based on a recovery milestone. At time T0, database blocks corresponding to a point-in-tune copy of the production database are received. These database blocks correspond to the database blocks of the production database that changed since the last point-in-time copy was received.

A first recovery milestone is created 410*a* at tune T1 right after the point-in-time copy of the production database is received once enough transaction logs are received to make create a consistent snapshot. Subsequently recovery milestones 410*b*, 410*c*, 410*d*, may be created based cin a predefined schedule, for example, on a regular basis. The frequency at which the recovery milestones are created is typically higher than the frequency at which point-in-tune copies of databases are received from the production database. For example, if a point-in-time copy of the production database is received daily, the recovery milestone may be created on an hourly basis or once every 30 minutes. Creating a recovery milestone comprises applying 430 transaction logs received from the production database to the previous recovery milestone created or to the point-in-time copy of the database received in the case of the first recovery milestone created after receiving the point-in-time copy of the database.

The validation module 285 validates each recovery milestone created to determine whether a valid database snapshot can be created based on the recovery milestone. If the validation module 285 identifies 420 a problem, the validation module 285 performs any required procedure to correct the problem. In a embodiment, the validation module 285 may create a virtual database for purposes of validation. For example, the validation may be performed by executing a test query on a virtual database based on the recovery milestone. Alternatively, the process of starting up a database server based on the virtual database may indicate whether the virtual database is valid.

When a request to provision a virtual database corresponding to time TN is received, the virtual database manager 275 identifies the most recent recovery milestone that was created before the time TN (e.g., time T4 as shown in FIG. 4) and creates 310b a database snapshot based on the identified recovery milestone. In an embodiment, if a virtual database is created by applying transaction logs to the recent most recovery milestone, a new recovery milestone is created corresponding to the requested virtual database. The new recovery milestone can be used to create subsequent recovery milestones.

Figure 5:
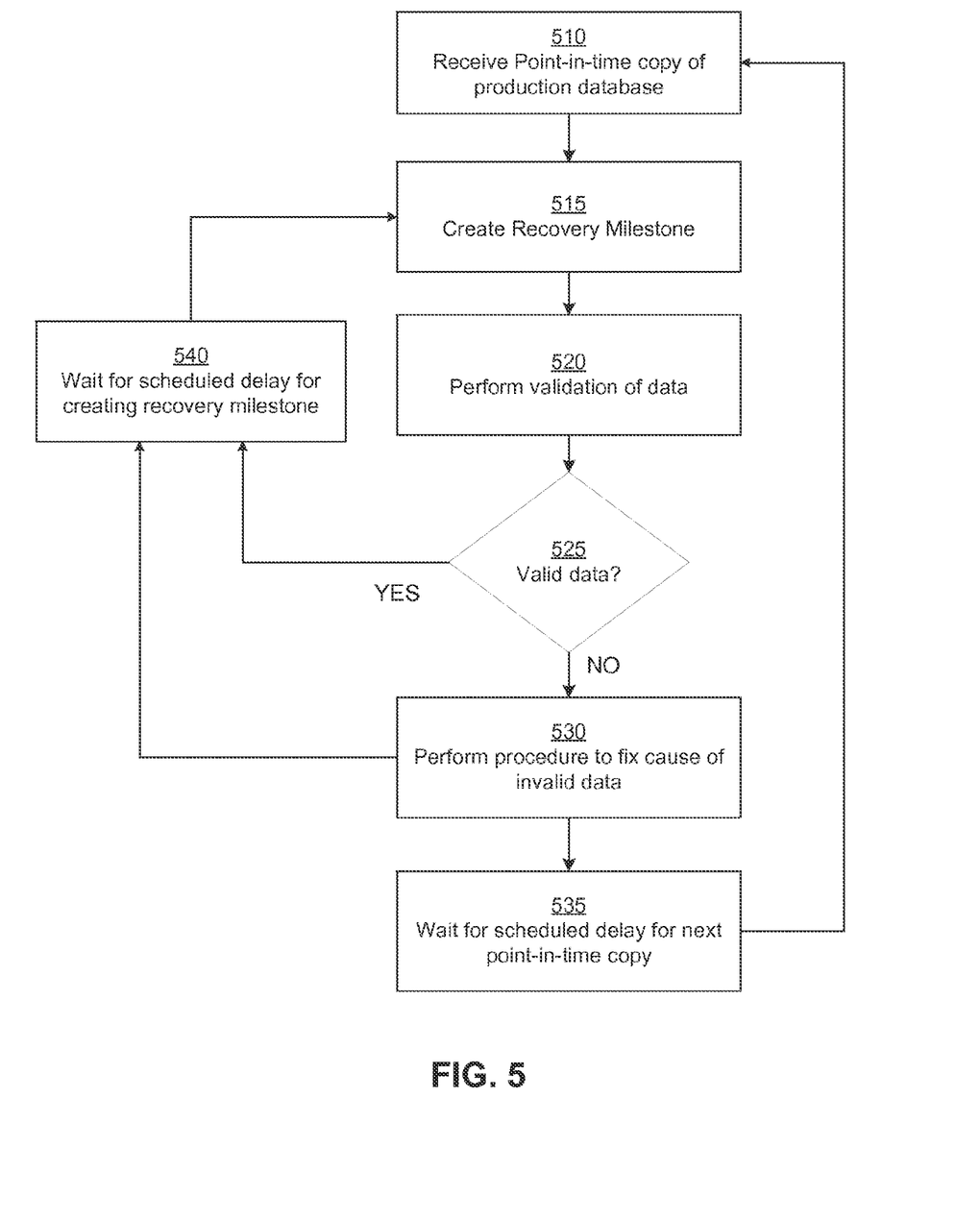
FIG. 5 is a flowchart of the process for pre-provisioning validated snapshots of a database, in accordance with an embodiment of the invention.

FIG. 5 is a flowchart of the process for pre-provisioning validated snapshots of a database, in accordance with an embodiment of the invention. The point-in-time copy manager 210 receives 510 a point-in-time copy of the production database. The point-in-time copy may be received based on a predefined schedule or on demand based on a user command. For example, the point-in-time copy manager 210 may receive the point-in-time copy from the production database periodically, for example, every day at a particular time or once every few days. The transaction tog manager 220 periodically retrieves transaction logs from the production database. Typically the rate at which the transaction log manager 220 retrieves the transaction logs is higher than the rate at which the point-in-time copy of the production database is retrieved. The point-in-time copy manager 210 waits 535 for a scheduled delay before receiving the next point-in-time copy. The point-in-time copy of the production database comprises the database blocks of the production database that changed since the previous point-in-time copy was obtained.

The recovery milestone manager 280 creates recovery milestones on a periodic basis. The frequency at which the recovery milestone manager 280 creates recovery milestones is higher than the frequency at which the point-in-time copy is retrieved. As a result, several recovery milestones are typically created corresponding to each point-in-time copy of the production database that is retrieved. In an embodiment, the recovery milestone manager 280 creates a recovery milestone after getting the point-in-time copy of the production database right after the transaction log manager 220 retrieves logs that are needed for creating a consistent snapshot. In an embodiment, the recovery milestone manager 280 invokes an application programming interface (API) for executing a process for determining if the logs retrieved can create a consistent snapshot. The meta data associated with the logs is analyzed to determine if they contain ti changes needed to make the snapshot consistent. The recoverability is computed a priori to determine whether required logs are missing.

For example, as shown in NG. 4, a recovery milestone is created 410a at time T1 right after the point in time copy is received 305b at time T0. Subsequently, the recovery milestones are created 515 based on a predefined schedule. For example, as shown in FIG. 5, the recovery milestone manager 280 waits 540 for a scheduled delay before creating the next recovery milestone.

The recovery milestone manager 280 applies the database logs obtained by the transaction log manager 220 to the point-in-time copy of the production database received 510 to obtain a recovery milestone. Subsequently, the recovery milestone manager 280 applies the database logs obtained by the transaction log manager 220 to the most recent recovery milestone. The validation module 285 performs 520 validation of the data obtained from the production database. For example, the validation module 285 may determine whether there is any corruption in the transaction logs obtained by the transaction log manager 220. If the transaction logs retrieved are corrupted, the recovery milestone manager 280 is unable to obtain a consistent snapshot of a database using the transaction logs. The corruption in the transaction logs may occur because a portion of the transaction logs is missing or overwritten by some other data.

If the validation module 285 determines 525 that the data retrieved is valid and a consistent database snapshot can be created using the retrieved data, the recovery milestone manager waits 540 for the scheduled delay before creating the next recovery milestone. If the validation module 285 determines 525 that the data obtained from the production database is not valid, the validation module 285 may perform 530 certain procedure to fix the cause of the invalid data. The validation module 285 may request the transaction logs from the production system again and verify whether the subsequent copy of the transaction logs is valid. In an embodiment, the validation module 285 presents required information to a system administrator to perform procedures to recover from any error that may have occurred. It is possible that the corruption in data occurred due to some defect or bug in the software used during one of the above steps, for example, the software executing the production database system. In this situation, the system administrator may have to perform certain updates to the software to fix the problem. Once the software has been properly upgraded, the system may be able to proceed with the steps of the flowchart illustrated in FIG. 5. These steps can take significant time in order to perform 530 the procedure to fix certain problems. In an embodiment, if the system determines that a milestone cannot be created because of missing logs, the system requests the missing logs or provides information to a system administrator enabling the system administrator to retrieve the missing logs.

The above process allows problems with the data to be fixed in advance of a request to provision a virtual database. For example, without the above process it is possible that the problem is recognized after a request for provisioning a virtual database is received, in this situation, the requestor of the virtual database may have to wait thr significant time while the procedure for fixing any problem is fixed before the virtual database is made available to the requestor.

The steps illustrated in the flowchart shown in FIG. 5 may be performed concurrently or in a different order than that shown in FIG. 5. For example, certain validation steps may be performed 520 before the recovery milestone is created 515. Also, certain steps may be performed by different modules instead of the modules described above. The creation of recovery milestones can be policy driven or on-demand based on requests.

In some embodiments, the production database may be set up so that logging is turned off for one or more tables. If logging is completely turned off for all tables, the pre-provisioning of virtual databases may not be performed by applying logs since logs are not available. However, in some situations, logging may be turned off for some tables but available for other tables. In these situations, the pre-provisioning can be performed such that the user can query only tables for which logging is available in the virtual database that is created. If the user attempts to query tables for which logging is turned off, the user may not get latest information or even a consistent snapshot for these tables.

Also, the user may not be able to execute queries that join tables with logging on and tables with logging off in a virtual database generated from a pre-provisioned recovery milestone. For tables that have logging turned off, latest information describing the table is obtained by receiving database blocks from the production database rather than by receiving transaction logs.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that wo or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or preset) and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating virtual databases from point-in-time copies of production databases stored in a storage manager. Thus, white particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for pre-provisioning validated database snapshots, the method comprising:
   receiving a plurality of point-in-time copies of a source database, the plurality of point-in-time copies received based on a first predefined schedule;
   storing a plurality of database blocks associated with the plurality of point-in-time copies on a storage system;
   receiving transaction logs corresponding to transactions executed in the source database;
   creating a plurality of recovery milestones based on a second predefined schedule, wherein the recovery milestones are created at a frequency higher than a frequency at which point-in-time copies of the source database are received, each recovery milestone comprising database blocks corresponding to a state of the source database at a point in time, wherein one or more database blocks are shared across two or more recovery milestones, the creating comprising:
      creating a first recovery milestone by applying transaction logs to the plurality of database blocks associated with a point-in-time copy of the source database, and
      creating one or more subsequent recovery milestones by applying transaction logs to database blocks of the first recovery milestone or by applying transaction logs to database blocks of another recovery milestone created based on the first recovery milestone;
   receiving a request to provision a virtual database representing a state of the source database at a first point in time;
   identifying a recovery milestone based on the first point in time; and
   provisioning the requested virtual database based on the identified recovery milestone, the virtual database configured to provide access to database blocks associated with the recovery milestone to a target system.

2. The method of claim 1, wherein identifying the recovery milestone based on the first point-in-time comprises
   responsive to the first point in time matching the point in time of a particular recovery milestone, using the particular recovery milestone as the identified recovery milestone.

3. The method of claim 1, wherein responsive to the first point in time not matching point in times of any of the recovery milestones, identifying the recovery milestone comprises selecting a recovery milestone with a point in time closest to and occurring prior to the first point in time, and wherein provisioning the requested virtual database comprises:
   updating the database blocks of the identified recovery milestone by applying transaction logs to database blocks of the identified recovery milestone; and provisioning the requested virtual database using the updated database blocks.

4. The method of claim 3, further comprising:
creating a new recovery milestone based on the updated database blocks corresponding to the virtual database.

5. The method of claim 1, further comprising:
validating the recovery milestone created to determine whether the recovery milestone can be used to create a consistent snapshot of the source database.

6. The method of claim 5, wherein validating the recovery milestone comprises:
identifying a problem associated with creation of a recovery milestone; and
responsive to identifying the problem, taking actions to fix the problem in advance of the request to create a virtual database based on the recovery milestone.

7. The method of claim 6, wherein the actions for fixing the problem comprise, receiving a recent version of a vendor library and using the recent version of the vendor library for creating the recovery milestone.

8. The method of claim 1, wherein the source database performs logging for a set of tables and disables logging for tables outside the set of tables, the method further comprising:
responsive to the provisioned virtual database receiving a query based on one or more tables outside the set of tables, disallowing the query.

9. A method for pre-provisioning validated database snapshots, the method comprising:
receiving a plurality of point-in-time copies of a source database, the plurality of point-in-time copies received based on a first predefined schedule;
storing a plurality of database blocks associated with the plurality of point-in-time copies on a storage system;
receiving transaction logs corresponding to transactions executed in the source database; and
creating a plurality of recovery milestones based on a second predefined schedule, wherein the recovery milestones are created at a frequency higher than a frequency at which point-in-time copies of the source database are received, each recovery milestone comprising database blocks corresponding to a state of the source database at a point in time, wherein one or more database blocks are shared across two or more recovery milestones, and wherein a recovery milestone is created in advance of receiving a request for creation of a virtual database for the point-in-time of the recovery milestone, the creating comprising:
creating a first recovery milestone by applying transaction logs to the plurality of database blocks associated with a point-in-time copy of the source database, and
creating one or more subsequent recovery milestones by applying transaction logs to database blocks of the first recovery milestone or by applying transaction logs to database blocks of another recovery milestone created based on the first recovery milestone.

10. The method of claim 9, further comprising:
receiving request to create a virtual database representing a state of the source database at a first point in time;
responsive to the first point in time matching point in time of a recovery milestone, selecting the matching recovery milestone; and
provisioning the requested virtual database based on the database blocks of the selected recovery milestone.

11. The method of claim 9, further comprising:
receiving request to create a virtual database representing a state of the source database at a first point in time;
responsive to the first point in time not matching point in times of any of the recovery milestones, selecting a recovery milestone with a point in time closest to and occurring prior to the requested point in time; and
provisioning the requested virtual database based on the database blocks of the selected recovery milestone.

12. The method of claim 9, wherein creating each recovery milestone further comprises:
validating the recovery milestone created to determine whether the recovery milestone can be used to create a consistent snapshot of the source database.

13. The method of claim 12, wherein validating the recovery milestone comprises:
responsive to determining that a set of transaction logs corresponding to the recovery milestone are corrupted, determining that the recovery milestone is invalid.

14. The method of claim 12, wherein validating the recovery milestone comprises:
responsive to the determining that the recovery milestone is invalid, executing steps to identify a defect resulting in creation of the invalid recovery milestone and executing steps to fix the defect.

15. The method of claim 9, wherein the source database performs logging for a set of tables and disables logging for tables outside the set of tables, the method further comprising:
responsive to the provisioned virtual database receiving a query based on one or more tables outside the set of tables, disallowing the query.

16. A computer program product having a non-transitory computer-readable storage medium storing computer program modules configured to execute on a computer processor, the computer program modules comprising instructions for:
receiving a plurality of point-in-time copies of a source database, the plurality of point-in-time copies received based on a first predefined schedule;
storing a plurality of database blocks associated with the plurality of point-in-time copies on a storage system;
receiving transaction logs corresponding to transactions executed in the source database;
creating a plurality of recovery milestones based on a second predefined schedule, wherein the recovery milestones are created at a frequency higher than a frequency at which point-in-time copies of the source database are received, each recovery milestone comprising database blocks corresponding to a state of the source database at a point in time, wherein one or more database blocks are shared across two or more recovery milestones, the creating comprising:
creating a first recovery milestone by applying transaction logs to the plurality of database blocks associated with a point-in-time copy of the source database, and
creating one or more subsequent recovery milestones by applying transaction logs to database blocks of the first recovery milestone or by applying transaction logs to database blocks of another recovery milestone created based on the first recovery milestone;
receiving a request to provision a virtual database representing a state of the source database at a first point in time;

identifying a recovery milestone based on the first point in time; and provisioning the requested virtual database based on the identified recovery milestone, the virtual database configured to provide access to database blocks associated with the recovery milestone to a target system.

17. The computer program product of claim 16, wherein identifying the recovery milestone comprises, selecting a recovery milestone with a point in time closest to and occurring prior to the requested point in time and wherein provisioning the requested virtual database comprises:

applying transaction logs to the database blocks of the identified recovery milestone to create a database snapshot corresponding to the requested point in time; and provisioning the requested virtual database comprising the database blocks of the database snapshot created.

18. The computer program product of claim 16, wherein validating the recovery milestone comprises:

responsive to determining that a set of transaction logs corresponding to the recovery milestone are corrupted, determining that the recovery milestone is invalid; and responsive to the determining that the recovery milestone is invalid, executing steps to identify a defect resulting in creation of the invalid recovery milestone and executing steps to fix the defect.

19. The computer program product of claim 16, wherein the source database performs logging for a set of tables and disables logging for tables outside the set of tables, the computer program modules further comprising instructions for:

responsive to the provisioned virtual database receiving a query based on one or more tables outside the set of tables, disallowing the query.

* * * * *